US010247831B2

(12) United States Patent
Sasaki et al.

(10) Patent No.: US 10,247,831 B2
(45) Date of Patent: Apr. 2, 2019

(54) NAVIGATION SIGNAL PROCESSING DEVICE, NAVIGATION SIGNAL PROCESSING METHOD, AND NAVIGATION SIGNAL PROCESSING PROGRAM

(71) Applicant: TOPCON CORPORATION, Itabashi-ku (JP)

(72) Inventors: You Sasaki, Itabashi-ku (JP); Tadayuki Ito, Itabashi-ku (JP)

(73) Assignee: TOPCON CORPORATION, Itabashi-ku (JP)

( * ) Notice: Subject to any disclaimer, the term of this patent is extended or adjusted under 35 U.S.C. 154(b) by 320 days.

(21) Appl. No.: 15/193,824

(22) Filed: Jun. 27, 2016

(65) Prior Publication Data

US 2017/0003395 A1 Jan. 5, 2017

(30) Foreign Application Priority Data

Jul. 2, 2015 (JP) ................................. 2015-133349

(51) Int. Cl.
*G01S 19/42* (2010.01)

(52) U.S. Cl.
CPC ............ *G01S 19/428* (2013.01); *G01S 19/42* (2013.01)

(58) Field of Classification Search
CPC ........ G01S 19/428; G01S 19/42; G01S 19/22; G01S 19/18; G01S 19/29; G01S 13/003
USPC .................................................... 342/357.61
See application file for complete search history.

(56) References Cited

U.S. PATENT DOCUMENTS

| 2008/0114546 | A1* | 5/2008 | Kamel | ................... | G01C 21/00 701/530 |
| 2012/0059578 | A1* | 3/2012 | Venkatrannan | ........ | G01C 21/20 701/411 |
| 2013/0088389 | A1 | 4/2013 | Yamada | | |
| 2014/0320650 | A1* | 10/2014 | Hong | ..................... | H04N 7/185 348/144 |
| 2015/0369924 | A1* | 12/2015 | Hedgecock | ............. | G01S 19/51 342/357.34 |

FOREIGN PATENT DOCUMENTS

| JP | 2006-162563 | 6/2006 |
| JP | 2013-83480 | 5/2013 |

* cited by examiner

*Primary Examiner* — Harry K Liu
(74) *Attorney, Agent, or Firm* — Xsensus, LLP

(57) ABSTRACT

A navigation signal processing device includes circuitry configured to perform positioning of an antenna based on navigation signals received by the antenna from navigation satellites, set an elevation angle mask that causes inhibition of utilization of the navigation signals that are received from a specific angle range as viewed from the antenna in the positioning of the antenna, and obtain three-dimensional point cloud position data that includes data of multiple points of the surroundings as viewed from the antenna. The multiple points are obtained by a laser scanner or a stereoscopic camera and have determined three-dimensional coordinates. The circuitry is further configured to set the elevation angle mask that causes inhibition of utilization of the navigation signals that are received from a straight line direction connecting the antenna and each of the multiple points of the three-dimensional point cloud position data as viewed from the antenna.

5 Claims, 6 Drawing Sheets

NAVIGATION SIGNAL PROCESSING DEVICE, NAVIGATION SIGNAL PROCESSING METHOD, AND NAVIGATION SIGNAL PROCESSING PROGRAM

BACKGROUND OF THE INVENTION

Technical Field

The present invention relates to a positioning technique using a GNSS (Global Navigation Satellite System).

Background Art

In a GNSS, positioning signals are received from navigation satellites, and positions are measured. The positioning using a GNSS tends to be performed with less precision due to reflected waves (multiple paths) that are received even though direct waves of positioning signals are blocked off by buildings, trees, etc. The GNSS can be executed by setting an elevation angle mask so as not to use positioning signals from lower angles at which reflected waves tend to be generated (for example, refer to Japanese Unexamined Patent Application Laid-Open No. 2013-083480). A technique relating to this technique is disclosed in Japanese Unexamined Patent Application Laid-Open No. 2006-162563. In this technique, a database of three-dimensional geographical information of buildings and the like is used for judging whether there is a building in a viewing direction to a satellite, and whether there is a probability of generation of reflected waves from a building is judged.

In the case of a mobile body, since positioning is performed while the mobile body travels, the optimum setting of the elevation angle mask is changed in real time. In view of this, the technique that is disclosed in Japanese Unexamined Patent Application Laid-Open No. 2013-083480 may not be appropriate. Moreover, there may be cases in which the positioning is performed where no three-dimensional geographic information has been prepared. Furthermore, since the effects of trees and the like change according to the elapse of time and the seasons, three-dimensional geographic information that is prepared in advance may not be effectively utilized. This is similar in the case of buildings because buildings can be changed by new construction, extension, reconstruction, etc. In view of these, the technique that is disclosed in Japanese Unexamined Patent Application Laid-Open No. 2006-162563 may also not solve the above problem.

SUMMARY OF THE INVENTION

In view of these circumstances, an object of the present invention is to provide a technique for preventing decrease in the positioning precision due to reflected waves from a navigation satellite that is blocked by an obstacle in a positioning technique using a GNSS.

A first aspect of the present invention provides a navigation signal processing device including a positioning unit that is configured to perform positioning based on navigation signals from navigation satellites, a setting unit that is configured to set a condition for restricting utilization of the navigation signals from a specific navigation satellite, and a three-dimensional point cloud position data obtaining unit that is configured to obtain three-dimensional point cloud position data of the surroundings of an antenna that receives the navigation signals. In this case, the setting unit sets the condition based on the three-dimensional point cloud position data. According to the first aspect of the present invention, utilization of the navigation satellite is restricted based on the three-dimensional point cloud position data of the surroundings. According to the present invention, decrease in the positioning precision due to the effects of the navigation satellite that is blocked by a building or the like is prevented.

According to a second aspect of the present invention, in the invention according to the first aspect of the present invention, the setting unit may project a point cloud, which constitutes the three-dimensional point cloud position data, on the celestial sphere surface as viewed from the antenna and may set a condition for restricting utilization of a navigation satellite that is positioned in an area of the celestial sphere surface, at which the point cloud is projected. According to the second aspect of the present invention, utilization of the navigation satellite that is blocked by an object (building, tree, etc.), which is represented by the point cloud, is restricted, whereby decrease in the positioning precision due to multiple paths and the like of the navigation signal is prevented.

According to a third aspect of the present invention, in the invention according to the first or the second aspect of the present invention, the setting unit may set an elevation angle mask.

According to a fourth aspect of the present invention, in the invention according to any one of the first to the third aspects of the present invention, the three-dimensional point cloud position data may be updated at a predetermined time interval, and the condition for restricting utilization of the navigation signals may be updated according to the update of the three-dimensional point cloud position data. According to the fourth aspect of the present invention, information of a navigation satellite, which is not appropriate for the positioning, is updated constantly.

For example, when a vehicle travels while performing the positioning by using a GNSS, the relative locational relationship between a GNSS antenna and a blocking object such as a building, a tree, etc. is changed according to the elapse of time.

According to the fourth aspect of the present invention, since the processing for restricting the utilization of the navigation signals is performed according to the update of the three-dimensional point cloud position data, the condition for restricting the utilization of the navigation signals is updated constantly according to the three-dimensional condition of the surroundings. Therefore, decrease in the positioning precision is prevented in the case of performing the positioning while the vehicle travels.

A fifth aspect of the present invention provides a navigation signal processing method including performing positioning based on navigation signals from navigation satellites, setting a condition for restricting utilization of the navigation signals from a specific navigation satellite, and obtaining three-dimensional point cloud position data of the surroundings of an antenna that receives the navigation signals. In this case, the condition is set based on the three-dimensional point cloud position data.

A sixth aspect of the present invention provides a computer program product including a non-transitory computer-readable medium storing computer-executable program codes for processing navigation signals. The computer-executable program codes include program code instructions for performing positioning based on navigation signals from navigation satellites, setting a condition for restricting utilization of the navigation signals from a specific navigation satellite, and obtaining three-dimensional point cloud position data of the surroundings of an antenna that receives the navigation signals. In this case, the condition is set based on the three-dimensional point cloud position data.

According to the present invention, a technique for preventing decrease in the positioning precision due to reflected waves from a navigation satellite that is blocked by an obstacle is obtained in the positioning technique using a GNSS.

PREFERRED EMBODIMENTS OF THE INVENTION

Outline

In this embodiment, a vehicle that is equipped with a positioning device using a GNSS and devices for obtaining three-dimensional information of the surroundings, such as a laser scanner, a stereo camera, and the like, will be described. The vehicle performs positioning by using a GNSS while traveling and obtains three-dimensional information of the surroundings at the same time. Here, the position of the antenna relative to the vehicle is already known, and therefore, by obtaining three-dimensional information of the surroundings, information of a sky area (area of the sky that is not blocked by buildings and the like and can be seen) as viewed from the antenna is obtained. After the information of the sky area is obtained, an area, from which effective navigation signals can be obtained, as viewed from the antenna, is determined.

The information of the sky area is calculated and is updated in real time according to change in the three-dimensional information of the surroundings of a vehicle that travels. Then, in the vehicle, the setting of the elevation angle mask is corrected in real time based on the information of the sky area that is updated in real time. Thus, inappropriate positioning signals are removed from the calculation for the positioning or the priority of the calculation of the inappropriate positioning signals is reduced, whereby decrease in the positioning precision is prevented. The inappropriate positioning signals are navigation signals that are received by multiple paths and that have low precisions, and they are obtained from a navigation satellite that is positioned in an area, which is blocked by a building or the like and thereby cannot be directly viewed from the antenna.

Alternatively, instead of setting the elevation angle mask, judging whether the detected navigation satellite is positioned in a sky area may be performed. In this case, when the detected navigation satellite is positioned in the sky area, the navigation signals from this navigation satellite arc utilized for the positioning. Otherwise, the navigation signals from this navigation satellite are not utilized for the positioning or the priority of the calculation using this navigation signals for the positioning is reduced.

Figure 1:
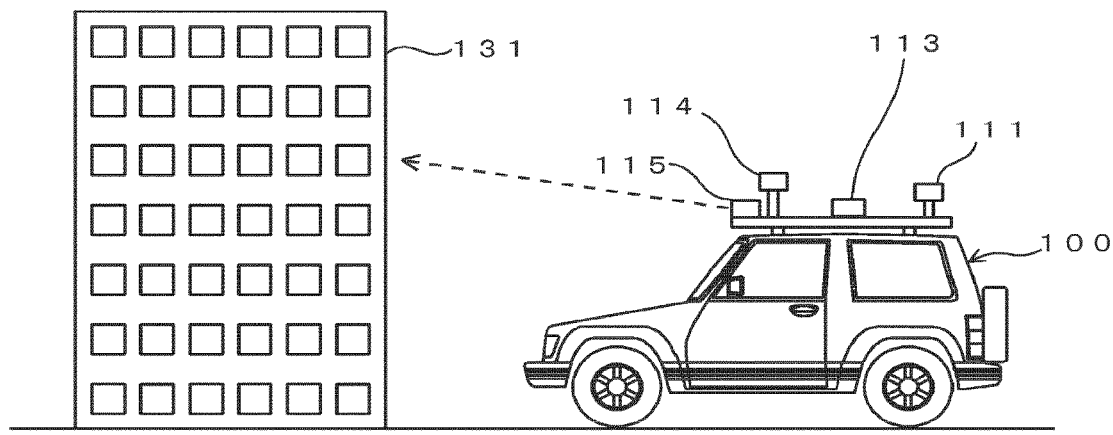
FIG. 1 shows a principle of performing positioning while a vehicle travels in an embodiment.

FIG. 1 shows a vehicle 100 that is equipped with an antenna 111, an operating device 113, a camera 114, and a laser scanner 115. The antenna 111 receives navigation signals from navigation satellites such as GPS satellites or the like. The navigation signals contain transmission times of the navigation signals, orbital information of the navigation satellites, code information which is used for measuring propagation times of the navigation signals and the like, etc. The applicable navigation satellites are not limited to the GPS satellites and may be navigation satellites of other types. As the navigation satellites, navigation satellites that complement a GPS system may also be used. These types of navigation satellites include navigation satellites that are controlled by a qusai-zenith satellite system.

The operating device 113 is hardware that functions as a computer and has the structure shown in FIG. 2 (described later), and it performs the processing shown in FIGS. 3 and 6. The camera 114 is a panoramic animation camera that can photograph moving images of the entirety of the surroundings. Although details are not given here, data of the moving images that are taken by the camera 114 is linked with three-dimensional point cloud position data that is measured by the laser scanner 115 (described later), and they are used in the processing for converting the conditions of the surroundings, which are obtained while the vehicle travels, into data.

The laser scanner 115 emits distance measuring light (distance measuring laser light) on an object and detects light that is reflected at the object, and then it measures a distance to the object therefrom and obtains three-dimensional point cloud position data of the object based on the distance to the object and the emitting direction of the distance measuring light. The three-dimensional point cloud position data is constituted of numerous points, of which three-dimensional coordinate values are identified, and quantitatively represents the three-dimensional shape of the object by the numerous points. The laser scanner 115 operates at a predetermined time interval. The time interval may be approximately 1 Hz to 10 Hz (0.1 seconds to 1 second), for example.

The laser scanner is as disclosed in Japanese Unexamined Patent Applications Laid-Open Nos. 2008-268004 and 2010-151682. The position of the antenna 111 relative to the vehicle 100, and the exterior orientation parameters (position and attitude) of each of the camera 114 and the laser scanner 115 relative to the vehicle 100, are preliminarily obtained and are known.

1. First Embodiment

Structure of Operating Device

Here, a case of obtaining three-dimensional information surrounding a vehicle in real time and setting an elevation angle mask based on the three-dimensional information will be exemplified. FIG. 2 shows a block diagram of the operating device 113 that is equipped on the vehicle 100. The operating device 113 includes a data obtaining unit 121, a vehicle location calculating unit 122, a point cloud position data obtaining unit 123, a sky area calculating unit 124, and an elevation angle mask setting unit 125 as functional units. The operating device 113 has functions as a computer and includes a CPU, a RAM, a ROM, necessary storage devices, various kinds of operating devices such as an image processing integrated circuit, and various kinds of interfaces. The functional units of the operating device 113 may be constructed of software or may be constructed of dedicated hardware. For example, each of the functional units shown in FIG. 2 is composed of electronic circuits including a CPU (Central Processing Unit), an ASIC (Application Specific Integrated Circuit), and a PLD (Programmable Logic Device) such as an FPGA (Field Programmable Gate Array).

The data obtaining unit 121 obtains data of navigation signals that are received from the navigation satellites. The data obtaining unit 121 performs the processing in step S101 shown in FIG. 3. The vehicle location calculating unit 122 is a positioning device using a GNSS and performs positioning of the vehicle 100 based on the navigation signals that are received by the antenna 111. The processing that is performed by the vehicle location calculating unit 122 is similar to the processing in an ordinary GNSS device. The vehicle location calculating unit 122 executes the processing in step S102 shown in FIG. 3.

The vehicle location calculating unit 122 receives input of the setting of an elevation angle mask for restricting the elevation position of the navigation satellite to be used. For example, when the elevation angle mask is set so as to mask an area of not greater than 15 degrees, the vehicle location calculating unit 122 does not use information from a navigation satellite that is positioned on the celestial sphere surface at the elevation angle of not greater than 15 degrees or reduces the weighting of this information (lowers the priority of this information). The elevation angle mask can be set at each azimuth angle. The setting of the elevation angle mask and the like may be found in Technical Notes of the NILIM (National Institute for Land and Infrastructure Management), No. 513, published on January 2009, for example. This document discloses a software specification that may be used in a GNSS.

The point cloud position data obtaining unit 123 obtains three-dimensional point cloud position data of conditions surrounding the vehicle, which is measured by the laser scanner 115. The point cloud position data obtaining unit 123 executes the processing in step S103 shown in FIG. 3. The sky area calculating unit 124 calculates the sky area based on the three-dimensional point cloud position data of the conditions surrounding the vehicle. The sky area is an area from which a direct wave of a navigation satellite as viewed from the antenna 111 can be received. In other words, in the sky area, the sky can be viewed from the antenna 111 without being blocked by an obstacle. The sky area calculating unit 124 executes the processing in step S104 shown in FIG. 3.

The elevation angle mask setting unit 125 sets and inputs the elevation angle mask in the vehicle location calculating unit 122 based on the sky area that is calculated by the sky area calculating unit 124. The elevation angle mask setting unit 125 executes the processing in step S105 shown in FIG. 3. The elevation angle mask setting unit 125 is an example of a setting unit that sets a condition for restricting utilization of navigation signals from a specific navigation satellite.

Processing Example

Figure 2:
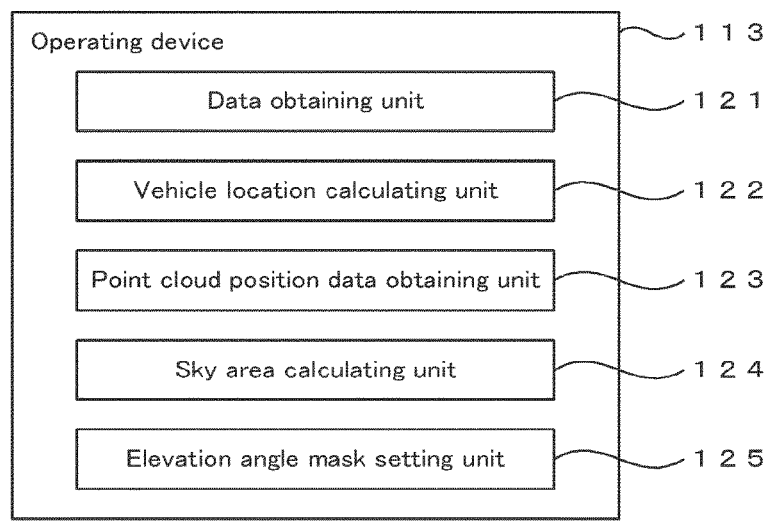
FIG. 2 is a block diagram of an operating device in an embodiment.
Figure 3:
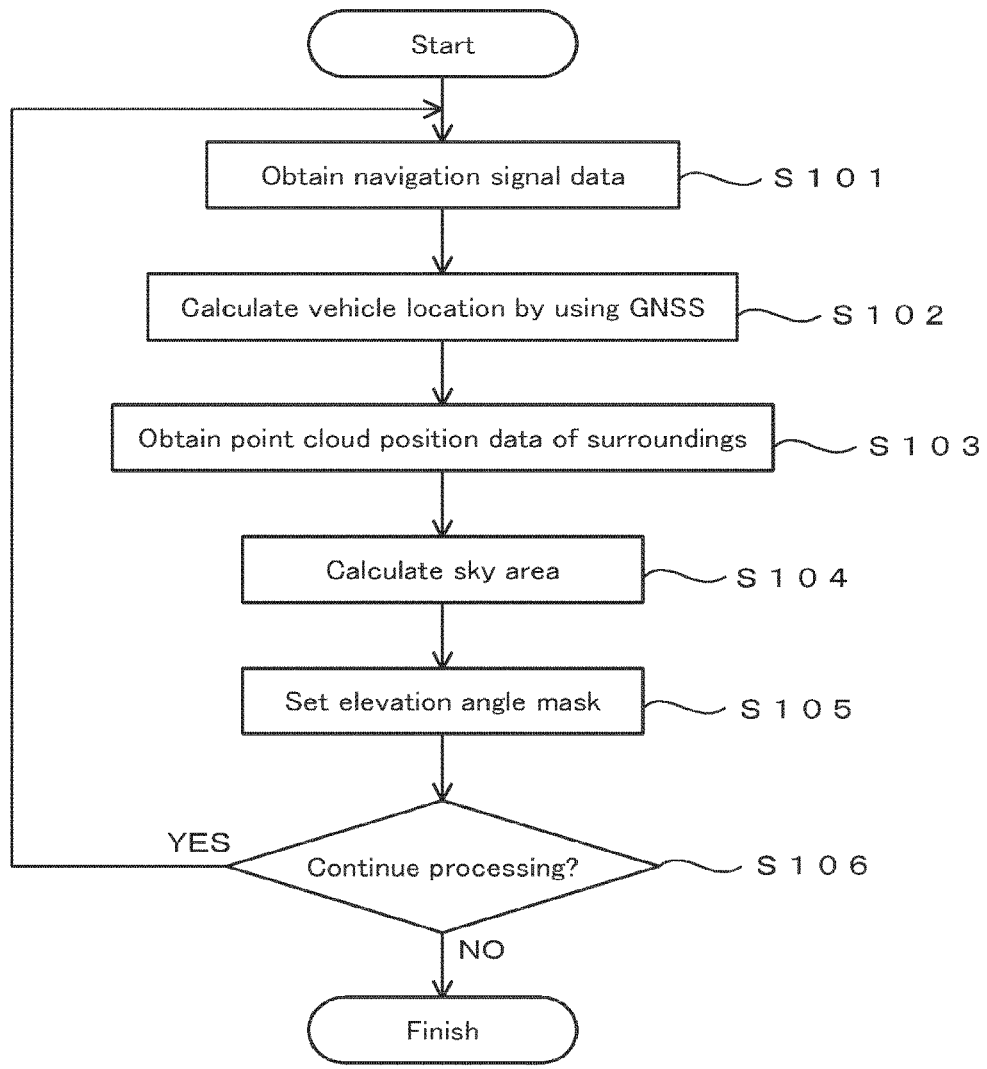
FIG. 3 is a flow chart showing an example of a processing procedure.

FIG. 3 shows an example of processing that is executed by hardware shown in FIG. 2. Programs for executing the processing shown in FIG. 3 are stored in an appropriate storage medium or a storage device, and the programs are read therefrom and are executed by the operating device 113 shown in FIG. 1. The processing shown in FIG. 3 can be performed while the vehicle travels and can also be performed while the vehicle is parked or is stopped.

The processing shown in FIG. 3 is performed at a cycle of 5 Hz, for example. In this case, the processing from step S101 to step S106 is consecutively performed at every 0.2 seconds or is intermittently performed. The interval of the processing is appropriately set according to the performance of hardware and the electric power consumption. In addition, the interval of the processing may be made variable, and one of multiple setting conditions may be selected according to the situation. Such setting conditions are the same as in the processing shown in FIG. 6.

First, data of navigation signals that are received from navigation satellites is obtained (step S101). After the data of the navigation signals is obtained, the location is calculated based on the navigation signals (step S102). The calculation in the processing of this step is the same as the calculation of location by using an ordinary GNSS. Details of positioning using a GNSS are as disclosed in Japanese Unexamined Patent Application Laid-Open No. 2006-162563, for example.

Next, three-dimensional point cloud position data of the surroundings is obtained by using the laser scanner 115 (step S103). Alternatively, three-dimensional point cloud position data may be obtained by a stereoscopic method using two still images that are taken at a predetermined time interval. This technique is as disclosed in Japanese Unexamined Patent Application Laid-Open No. 2013-186816, for example.

Figure 4A:
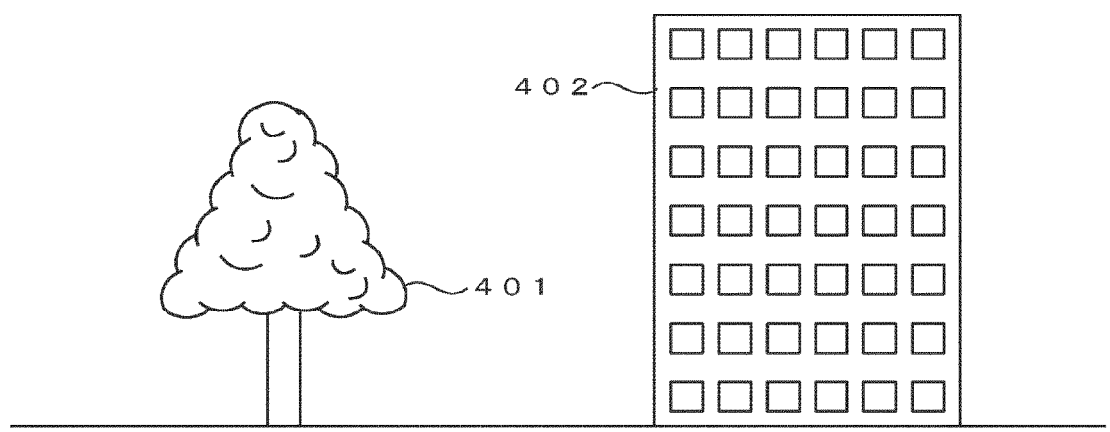
FIGS. 4A and 4B are images for explaining a principle for setting an elevation angle mask.

After the three-dimensional point cloud position data of the surroundings is obtained, the sky area as viewed from the antenna 111 is calculated (step S104). Hereinafter, details of the processing in step S104 will be exemplified. FIG. 4A shows an example of the surroundings that is viewed from the vehicle 100 with the position of the antenna 111 as a viewpoint. FIG. 4A shows a tree 401 and a building 402.

Figure 4B:
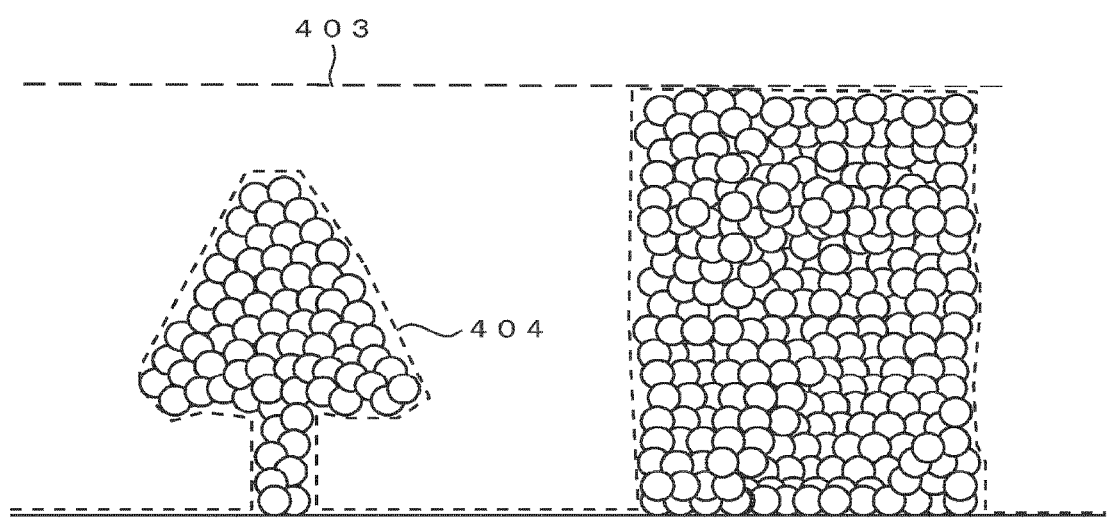

FIG. 4B shows point cloud position data that is obtained by performing laser scanning on the tree 401 and the building 402. Here, each circle mark is one point of the point clouds that are obtained in step S103 and is enlarged in the figure so as to be easily visible. In this case, the obtained point clouds are projected on the celestial sphere surface as viewed from the antenna 111 (the position of the antenna 111 is set at the center of the celestial sphere surface).

Specifically, the following processing is performed. First, a three-dimensional position of the antenna 111 and a three-dimensional location of each point of the point clouds that are obtained in step S103 are plotted in an appropriate coordinate system such as a coordinate system used in a GNSS. At this time, positional information of the antenna 111 and locational information of the points of the point clouds, which are obtained at times as close to each other as possible, are used. Then, the above coordinate system is converted into a coordinate system having the antenna 111 as the origin. Next, the celestial sphere surface having the position of the antenna 111 at the center is set in this coordinate system that is obtained by the coordinate conversion. Then, the origin (position of the antenna 111) and each of the points of the point clouds is connected by a straight line, and a point at which the straight line intersects with the celestial sphere surface is used as a projected point of the point clouds on the celestial sphere surface.

Here, an area where no points of the point clouds exist is set as the sky area. That is, an area of the celestial sphere surface, where there are no obstacles between the antenna 111 and the navigation satellite, is set as the sky area. In the calculation of the sky area in step S104, each of the points of the point clouds is enlarged to be a certain size so that spaces between adjacent points will not be included in the sky area. It should be noted that blocking objects that are so far away that the laser scanner 115 cannot obtain three-dimensional information thereof, are not processed here.

After the sky area is calculated, the elevation angle mask is set based on the information of the sky area that is set in step S104 (step S105). Here, the elevation angle mask is set so as to fit to the edges of the blocking objects as indicated by the reference numeral 404 shown in FIG. 4B, in order to mask the navigation satellite that exists at a position overlapping the point clouds as viewed from the antenna 111, that is, in order to not use the navigation satellite. In this case, the setting value of the elevation angle mask differs according to the azimuth. In addition, the elevation angle mask may be set so as to mask an area at an elevation angle in a range of 20 to 40 degrees, depending on the azimuth. The setting of the elevation angle mask restricts utilization of the navigation signals from a target navigation satellite in a specific elevation angle range in a specific azimuth. In this case, the data of the navigation signals from the target navigation satellite is given a low weighting or ignored so that the target navigation satellite will not adversely affect a positioning result.

The elevation angle mask may be set at each area of an azimuth angle of 5 degrees, 10 degrees, or the like. In another case, the elevation angle mask may be set at the same value in the entirety of the surroundings as indicated by reference numeral 403. For example, an area of not greater than 30 degrees is masked in the entirety of 360 degrees of the surroundings.

After the elevation angle mask is set, whether to continue the processing is judged (step S106). In order to continue the processing, the processing of step S101 and the subsequent steps is executed again. When the processing advances from step S106 to step S102 via step S101, navigation signals to be obtained in step S101 are limited by the elevation angle mask that is set in the preceding step S105. By repeating the cycle of the processing shown in FIG. 3, adverse effects of the navigation signals that are inappropriate for the positioning are reduced while as many navigation satellites as possible are utilized.

For example, when the processing from step S101 to step S105 is performed at a cycle of 5 Hz, the setting of the elevation angle mask is updated according to the three-dimensional information of the surroundings at 5 times per second (there may be timings at which the setting is not updated). Therefore, the setting of the elevation angle mask is dynamically changed constantly, whereby the navigation satellites are efficiently utilized, and the adverse effects of the navigation satellites that are not appropriate for the positioning are removed.

Modification

In the processing in step S104, a sky area after a predetermined time elapses may be calculated. That is, a sky area may be calculated at a future location of the vehicle that travels. When the processing in step S101 to step S105 is performed intermittently, a time lag is generated between the setting timing of the elevation angle mask in step S105 and the obtaining timing of the data of the navigation signals in step S101. If there is a time lag, since the vehicle travels and the conditions surrounding the vehicle are changed, there may be a probability that the set condition of the elevation angle mask deviates from an appropriate setting condition. In view of this, the future location of the vehicle is estimated considering the time difference corresponding to the time lag, and then the elevation angle mask is set based on the estimated future location.

Specifically, assuming that the time lag is $\Delta t$, the processing in step S104 is performed by using the estimated location of the vehicle at the time that is $\Delta t$ later from the time when the processing in step S104 is performed. The estimated location of the vehicle is calculated based on the travel trajectory of the vehicle. For example, assuming that the speed of the vehicle at the time when the processing in step S104 is performed is maintained for $\Delta t$, the location of the vehicle after $\Delta t$ elapses is calculated, and the sky area at this future location is calculated. In this processing, time t2 is obtained from a clock signal that controls the cycle of the processing shown in FIG. 3, and the time when the processing in step S104 is performed is represented by t1. Then, the value of $\Delta t$ is calculated from the formula $\Delta t = t2 - t1$.

2. Second Embodiment

Here, a case of judging whether there is a blocking object between the antenna and the navigation satellite and selecting an appropriate navigation satellite will be exemplified.

Structure

Figure 5:
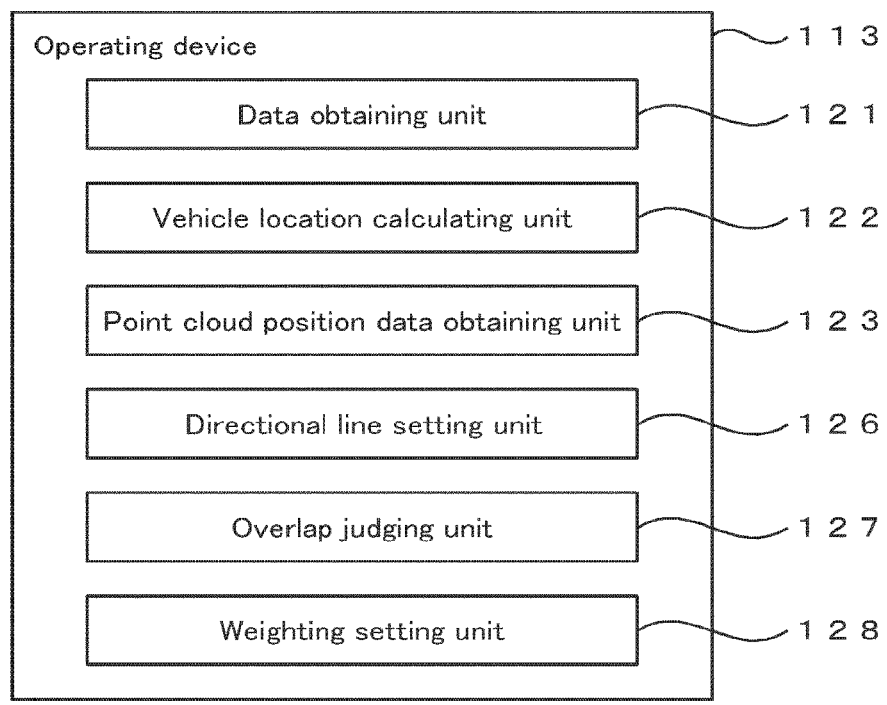
FIG. 5 is a block diagram of an operating device in an embodiment.

FIG. 5 shows a block diagram of an operating device 113 that is different from the type of the operating device 113 shown in FIG. 2. This operating device 113 includes a data obtaining unit 121, a vehicle location calculating unit 122, a point cloud position data obtaining unit 123, a directional line setting unit 126, an overlap judging unit 127, and a weighting setting unit 128. Here, the data obtaining unit 121, the vehicle location calculating unit 122, and the point cloud position data obtaining unit 123 are the same as those in the case shown in FIG. 2.

The directional line setting 126 selects a line that connects the antenna 111 and a captured navigation satellite as a directional line. The directional line is set as described below. First, the position of the antenna 111 and the position of the navigation satellite at a predetermined time are plotted in an appropriate coordinate system. This coordinate system is then converted into a coordinate system that has the position of the antenna 111 as the origin. Then, a line that connects the position of the antenna 111 and the position of the navigation satellite is set as a directional line. The directional line setting unit 126 performs the processing in step S204 shown in FIG. 6.

The overlap judging unit 127 judges whether the point clouds that are obtained by the point cloud position data obtaining unit 123 are on the directional line, that is, whether the point clouds and the directional line overlap with each other. In this processing, first, the point clouds of the conditions of the surroundings that are obtained by the point cloud position data obtaining unit 123 are projected on the celestial sphere surface that has the position of the antenna 111 at the center.

Specifically, first, a three-dimensional position of the antenna 111 and a three-dimensional location of each point of the point clouds that are obtained in step S203 are plotted in an appropriate coordinate system such as a coordinate system used in a GNSS. At this time, positional information of the antenna 111 and locational information of the points of the point clouds, which are obtained at times as close to each other as possible, are used. Then, the above coordinate system is converted into a coordinate system having the antenna 111 as the origin. Next, the celestial sphere surface having the position of the antenna 111 at the center is set in the coordinate system that is obtained by the coordinate conversion. Then, the origin (position of the antenna 111)

and each of the points of the point clouds is connected by a straight line, and a point at which the straight line intersects with the celestial sphere surface is used as a projected point of the point clouds on the celestial sphere surface.

Figure 6:
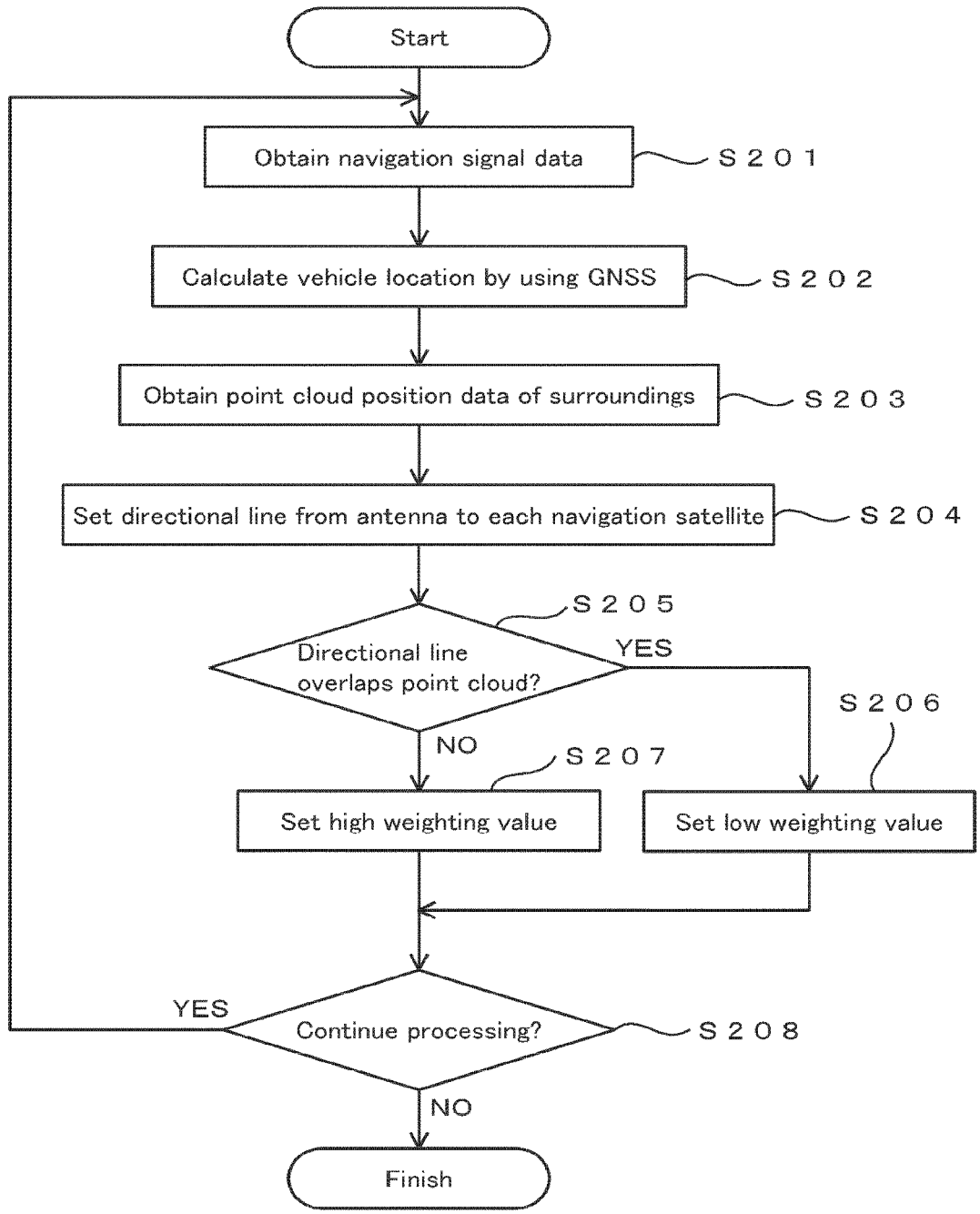
FIG. 6 is a flow chart showing an example of a processing procedure.
Figure 7:
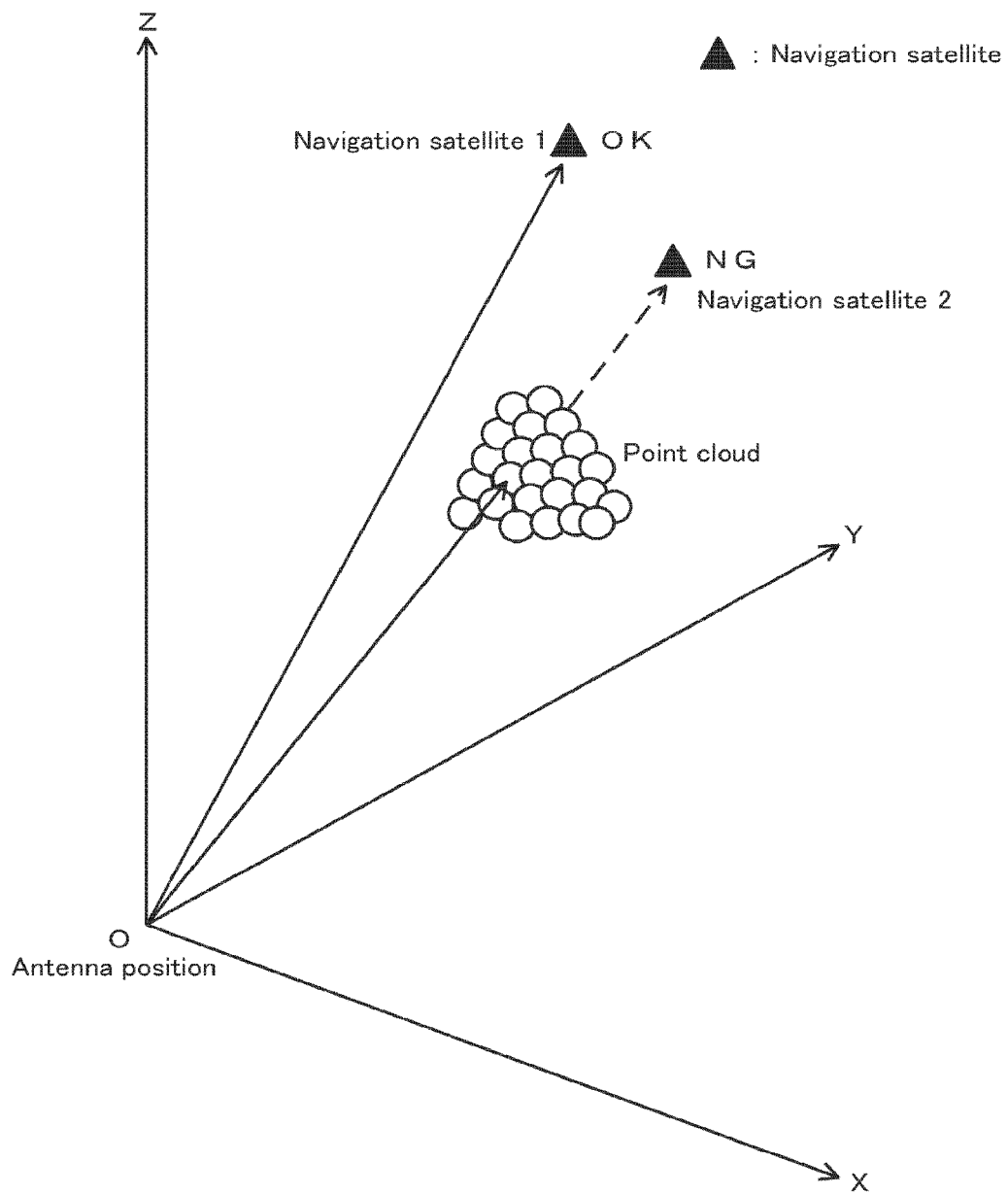
FIG. 7 shows a principle for determining a navigation satellite to be of low weighting.

Then, whether the point clouds that are projected on the celestial sphere surface and the directional line that is set by the directional line setting unit 126 overlap with each other is judged by the principle shown in FIG. 7. According to this judgement, whether a target navigation satellite is blocked by a building or the like as viewed from the antenna is judged. The overlap judging unit 127 performs the processing in step S205 shown in FIG. 6.

The weighting setting unit 128 sets a weighting relating to the utilization of the navigation signals from the navigation satellite based on the result of the judgement of the overlap judging unit 127. For example, when there is a point cloud, which is obtained by the point cloud position data obtaining unit 123, between the antenna 111 and a navigation satellite, the navigation satellite is blocked by an object (such as a building) that is a source of the point cloud, as viewed from the antenna 111. In this case, the utilization of the navigation signals from this navigation satellite or the utilization of the positioning data based on this navigation satellite is given a low weighting. Thus, margins of errors in the positioning data due to this navigation satellite that is blocked by a building or the like are decreased. The weighting setting unit 128 performs the processing in step S206 and step S207 shown in FIG. 6. The weighting setting unit 128 is an example of a setting unit that sets a condition for restricting utilization of navigation signals from a specific navigation satellite.

Processing Example

FIG. 6 shows an example of processing that is executed by hardware shown in FIG. 5. Programs for executing the processing shown in FIG. 6 are stored in an appropriate storage medium or a storage device, and the programs are read therefrom and are executed by the operating device 113 shown in FIG. 5. The processing shown in FIG. 6 can be performed while the vehicle travels and can be also performed while the vehicle is parked or is stopped. In the processing shown in FIG. 6, the processing in each of step S201, step S202, and step S203 is the same as the processing in each of step S101, step S102, and step S103 shown in FIG. 3, respectively.

In the processing in step S204 shown in FIG. 6, a directional line that connects the antenna position of the GNSS and each of the navigation satellites is set. After step S204, the processing advances to step S205. In step S205, whether the directional line that is set in step S204 and the points of the point clouds that are obtained in step S203 overlap with each other is judged.

FIG. 7 shows a principle of the judgement that is performed in step S205. FIG. 7 shows directional lines that are set from the antenna position "O" of the origin to each of the navigation satellites that are marked with black triangles. In this case, if there is a point cloud that is obtained in step S203 between the origin "O" and the navigation satellite, the judgement in step S205 results in YES. Otherwise, the judgement in step S205 results in NO. It should be noted that each of the points for constituting the point clouds is enlarged to be a certain size in the processing in step S205. In this example, the size of each of the points is set so as to fill spaces between adjacent points.

When the directional line that is set in step S204 and point cloud overlap with each other in the judgement in step S205, the processing advances to step S206. Otherwise, the processing advances to step S207. In step S206, a weighting relating to the utilization of the navigation signals from the target navigation satellite is made small. In this case, the weighting can be made zero, that is, the weighting can be set so as to ignore the target navigation satellite. Thus, the target navigation satellite is judged as being blocked by a building or the like and being not viewable from the antenna, or the navigation signals from the target navigation satellite are judged as being blocked by a building or the like, and the processing is performed accordingly.

The GNSS performs positioning by using navigation signals from multiple navigation satellites. At this time, since there are various types of sources of error, the calculated results tend to include uncertainties. In view of this, the information of the navigation satellite, by which the positioning is expected to be performed at high precision, is given a high weighting, whereas the information of the navigation satellite, by which the positioning is expected to be performed with low precision, is given a low weighting. This technique increases the precision of the result of the positioning so as to be high as possible.

In the above example, the utilization of the data of the navigation satellite that overlaps the position of the point cloud as viewed from the antenna is given a low weighting. Thus, the adverse effects of the navigation satellite, which is blocked by a building or the like as viewed from the antenna, on the positioning result, are reduced or removed.

In step S207, the target navigation satellite is given a high weighting. As a result, the weighting of the calculation result based on the navigation signals from the navigation satellite that is not blocked by an obstacle is increased. After step S206 or step S207, the processing advances to step S208, and whether to continue the processing is judged. Here, in order to continue the processing, the processing in step S201 and the subsequent steps is executed. Otherwise, the processing is terminated.

The future estimated location, which is described in relation to FIG. 3, may be used as the antenna position that is used in the processing in step S204 and step S205. That is, when the processing advances from step S204 to step S205, step S206 (step S207), step S208, and step S201, in this order, a time lag is generated between each of step S204 and step S205 and the subsequent step S201. It depends on the interval of the operation cycle, but in this case, there may be cases in which the navigation satellite is viewed at the time when step S204 is performed but becomes invisible at the time when step S201 is performed after step S204. In such a case, considering the time lag, the processing in each of step S204 and step S205 is performed based on an estimated location of the antenna in the near future. Details of this processing are similar to the contents described in relation to FIG. 3.

Modification

The moving directions of the navigation satellites in the sky may be calculated from transitions in their orbital information. Then, the processing in step S206 may be performed on a navigation satellite, which is expected to move in the direction approaching the position of an obtained three-dimensional point cloud and overlap the three-dimensional point cloud within a predetermined time. In this case, the weighting of the navigation satellite, by which the precision is expected to be decreased in the near future, or by which the decrease in the precision is highly probable, is decreased or is made zero. Thus, the decrease in the positioning precision is prevented beforehand.

Advantages

According to the processing shown in FIGS. 3 and 5, the navigation satellite that adversely affects the positioning, or the navigation satellite that has a probability of adversely affecting the positioning (for example, the navigation satellite positioned near the edge of a building as viewed from the antenna), is detected based on three-dimensional information of the surroundings that is obtained in real time. The three-dimensional structure of the surroundings changes due to new construction, extension of building, repair of building, growth of trees, changes in conditions of leaves due to seasons, etc. Therefore, by determining not to use of the navigation satellite or setting low priority on the navigation satellite based on the three-dimensional information that is obtained while the vehicle travels, the positioning is performed at high precision according to the three-dimensional conditions surrounding the vehicle.

3. Third Embodiment

The processing relating to the navigation satellite, which is unsuitable for use because the navigation satellite is blocked by a building or the like, may be performed in postprocessing. In this case, GNSS data that is received from the navigation satellites while the vehicle travels is stored as it is. At this time, inappropriate navigation satellites are not detected, and the original received data is linked with the time information as it is and is then stored in a storage device such as a semiconductor memory, a hard disk drive, or the like. On the other hand, positioning of the vehicle 100 is performed in real time by using the GNSS data, and three-dimensional point cloud position data is obtained by the laser scanner 115 at the same time.

Then, the obtained data is processed as described below at a later timing. Here, the processing shown in FIG. 3 is performed by using the GNSS data and the three-dimensional point cloud position data. By performing the processing shown in FIG. 3, an elevation angle mask at a predetermined timing (for example, every 0.2 seconds) is set in the postprocessing, and a navigation satellite that is unsuitable for use in a period including a specific time and before and after the specific time is determined.

Since the orbital information of the navigation satellite is obtained from the GNSS data that is obtained and is stored beforehand, information of the navigation satellite that is unsuitable for use at a specific time is obtained in the postprocessing. Then, the processing of the positioning at each time is performed again while the navigation signals of the navigation satellite that is unsuitable for use are not used or the utilization of these navigation signals is restricted. That is, by using the GNSS data that is already obtained, an elevation angle mask is set, and then the positioning calculation is performed again. According to this recalculation, the trajectory of the vehicle 100 that is obtained while the vehicle 100 travels is corrected. Then, by correcting the trajectory of the vehicle 100, the three-dimensional point cloud position data that is obtained by the laser scanner 115 is also corrected.

Thus, by performing the processing again by setting the elevation angle mask in the postprocessing, recalculation is performed while the effects of the navigation signals from the inappropriate navigation satellite are removed. As a result, the trajectory data of the vehicle 100 and the three-dimensional point cloud position data that is obtained while the vehicle 100 travels are corrected, whereby the precision of these data is improved.

In the above processing, the data of the navigation signals from the navigation satellites and the three-dimensional point cloud position data obtained by the laser scanner 115 are stored first. Then, the stored data is read at a later timing, the processing for the positioning is performed by using the elevation angle mask, and the three-dimensional point cloud position data is corrected. This method is performed in the postprocessing, and therefore, the burden on the hardware is less than that in the real time processing.

In the above processing, the trajectory of the vehicle 100 while traveling may be calculated based on the moving images that are taken by the camera 114. This technique is as disclosed in Japanese Unexamined Patent Application Laid-Open No. 2013-186816, for example. Although a case of performing the processing shown in FIG. 3 in the postprocessing is described here, the processing shown in FIG. 6 may be performed in the postprocessing. Naturally, the processing shown in FIG. 3 may be used in combination with the processing shown in FIG. 6.

Other Matters

A device that does not move may be used for obtaining three-dimensional point cloud position data of the surroundings. As described above, the three-dimensional structure of the surroundings changes due to new construction, extension of building, repair of building, growth of trees, changes in conditions of leaves due to seasons, etc. Nevertheless, the positioning is performed with high precision by using the present invention in the case of using the device that does not move.

What is claimed is:

1. A navigation signal processing device comprising:
circuitry configured to
perform positioning of an antenna based on navigation signals received by the antenna from navigation satellites;
set an elevation angle mask that causes inhibition of utilization of the navigation signals that are received from a specific angle range as viewed from the antenna in the positioning of the antenna; and
obtain three-dimensional point cloud position data that includes data of multiple points of the surroundings as viewed from the antenna, the multiple points being obtained by a laser scanner or a stereoscopic camera and having determined three-dimensional coordinates,
wherein the circuitry is further configured to set the elevation angle mask that causes inhibition of utilization of the navigation signals that are received from a straight line direction connecting the antenna and each of the multiple points of the three-dimensional point cloud position data as viewed from the antenna.

2. The navigation signal processing device according to claim 1, wherein the three-dimensional point cloud position data is updated at a predetermined time interval, and the set elevation angle mask is updated according to the update of the three-dimensional point cloud position data.

3. The navigation signal processing device according to claim 1, wherein, on a basis of transitions in orbital information of the navigation satellites, the circuitry is configured to set a low priority on one or more of the navigation satellites, each of which is expected to move in a direction approaching the point of the three-dimensional point cloud position data and overlap the point of the three-dimensional point cloud position data within a predetermined time as viewed from the antenna, whereby a low weighting is given to the navigation signal from each of the one or more of the navigation satellites.

4. A navigation signal processing method comprising:
  performing positioning of an antenna based on navigation signals received by the antenna from navigation satellites;
  setting an elevation angle mask that causes inhibition of utilization of the navigation signals that are received from a specific angle range as viewed from the antenna in the positioning; and
  obtaining three-dimensional point cloud position data that includes data of multiple points of the surroundings as viewed from the antenna, the multiple points being obtained by a laser scanner or a stereoscopic camera and having determined three-dimensional coordinates,
  wherein the elevation angle mask is set to cause inhibition of utilization of the navigation signals that are received from a straight line direction connecting the antenna and each of the multiple points of the three-dimensional point cloud position data as viewed from the antenna.

5. A computer program product comprising a non-transitory computer-readable medium storing computer-executable program codes for processing navigation signals, the computer-executable program codes comprising program code instructions for:
  performing positioning of an antenna based on navigation signals received by the antenna from navigation satellites;
  setting an elevation angle mask that causes inhibition of utilization of the navigation signals that are received from a specific angle range as viewed from the antenna in the positioning; and
  obtaining three-dimensional point cloud position data that includes data of multiple points of the surroundings as viewed from the antenna, the multiple points being obtained by a laser scanner or a stereoscopic camera and having determined three-dimensional coordinates,
  wherein the elevation angle mask is set to cause inhibition of utilization of the navigation signals that are received from a straight line direction connecting the antenna and each of the multiple points of the three-dimensional point cloud position data as viewed from the antenna.

\* \* \* \* \*